United States Patent
Metz et al.

(10) Patent No.: US 11,819,785 B2
(45) Date of Patent: Nov. 21, 2023

(54) FILTRATION HEAD FOR A FILTER SYSTEM AND FUNNEL FOR USE IN CONJUNCTION WITH A FILTRATION HEAD

(71) Applicant: MERCK PATENT GMBH, Darmstadt (DE)

(72) Inventors: Didier Metz, Stotzheim (FR); Marisa Hohnadel, Bischheim (FR)

(73) Assignee: MERCK PATENT GMBH, Darmstadt (DE)

( * ) Notice: Subject to any disclaimer, the term of this patent is extended or adjusted under 35 U.S.C. 154(b) by 496 days.

(21) Appl. No.: 17/044,595

(22) PCT Filed: Apr. 3, 2019

(86) PCT No.: PCT/EP2019/058397
§ 371 (c)(1),
(2) Date: Oct. 1, 2020

(87) PCT Pub. No.: WO2019/193046
PCT Pub. Date: Oct. 10, 2019

(65) Prior Publication Data
US 2021/0023481 A1 Jan. 28, 2021

(30) Foreign Application Priority Data
Apr. 5, 2018 (EP) .................................. 18290028

(51) Int. Cl.
*B01D 29/05* (2006.01)
*B01D 35/30* (2006.01)
*B01D 63/08* (2006.01)

(52) U.S. Cl.
CPC ........... *B01D 29/055* (2013.01); *B01D 35/30* (2013.01); *B01D 63/087* (2013.01); *B01D 2201/4015* (2013.01); *B01D 2313/56* (2013.01)

(58) Field of Classification Search
CPC .... B01D 29/055; B01D 35/30; B01D 63/087; B01D 2201/4015; B01D 2313/56;
(Continued)

(56) References Cited

U.S. PATENT DOCUMENTS

| 4,468,321 A | 8/1984 | St. John |
| 5,124,041 A * | 6/1992 | Sheer ........................ C07K 1/36 |
| | | 435/6.12 |

(Continued)

FOREIGN PATENT DOCUMENTS

| CN | 204768290 U * | 11/2015 |
| CN | 204768290 U | 11/2015 |

(Continued)

OTHER PUBLICATIONS

Pall Life Scieneces: "Filtration Products for Air Monitoring and Sampling", Aug. 27, 2004 (Aug. 27, 2004), XP055591355, Retrieved from the Internet <URL:ecampus.nchu.edu.tw/4010253_Air_monitoring_BRO.pdf> [retrieved on May 23, 2019].

(Continued)

*Primary Examiner* — Madeline Gonzalez
(74) *Attorney, Agent, or Firm* — MILLEN, WHITE, ZELANO & BRANIGAN, PC; Ryan Pool

(57) ABSTRACT

Filtration head (1) for a filter system, comprising base (2) including filter support (3) for removable filter element (4) and a fluid path from one side of filter element (4) on filter support (3), through filter element (4), and to drainage outlet (5) of base (2), and holder device (6) for removably attaching funnel (7) to base (2) to form a sample fluid reservoir on one side of filter element (4), wherein holder device (6) comprises ring-shaped element (8) configured to extend about bottom peripheral flange (7a) surrounding a lower end of funnel (7) and to selectively apply a biasing force on a radially outward protruding portion (7b) of bottom periph- (Continued)

eral flange (7a) of funnel (7) to press funnel (7) against base (2). The filtration head allows the use of cardboard funnels without risk of liquid leakage between the funnel and the base.

15 Claims, 5 Drawing Sheets

(58) Field of Classification Search
CPC .......... B01D 2313/02; B01D 2313/025; B01D 2313/10; B01D 2313/105; B01D 2313/13; B01D 2313/54; B01D 2313/58; B01D 29/05; B01L 3/5635; B01L 2300/0681; B01L 2300/0832; B01L 2400/049
USPC ....... 210/348, 232, 249, 282, 439, 442, 446, 210/455
See application file for complete search history.

(56) References Cited

U.S. PATENT DOCUMENTS

| | | |
|---|---|---|
| 6,443,314 B2 | 9/2002 | Shiraiwa et al. |
| 2010/0038303 A1 | 2/2010 | Cai et al. |
| 2016/0310941 A1 | 10/2016 | Rajagopal et al. |

FOREIGN PATENT DOCUMENTS

| | | |
|---|---|---|
| CN | 205145722 U | 4/2016 |
| CN | 106267949 A | 1/2017 |
| EP | 1127607 A1 | 8/2001 |
| JP | 62013505 U | 1/1987 |
| WO | 11028704 A2 | 3/2011 |

OTHER PUBLICATIONS

Pall Life Sciences: "Open-face Filter Holders, Aluminum", Aug. 29, 2005 (Aug. 29, 2005), XP055591332, Retrieved from the Internet <URL:https://www.pall.com/content/dam/pall/laboratory/literature-library/non-gated/Open-face_Filter_Holders_Aluminum_PN_82044G.pdf> [retrieved on May 23, 2019].

John Pellegrino: "Filtration and Ultrafiltration Equipment and Techniques", Separation and Purification Methods., vol. 29, No. 1, Jul. 2, 2000 (Jul. 2, 2000), US, pp. 91-118, XP055591237, ISSN: 0360-2540, DOI: 10.1081/SPM-100100004.

Carmi Group SRL: "Modular Filtration Manifolds and Related Assembly Components new Specialized Manifold Producer", Mar. 17, 2018 (Mar. 17, 2018), XP055591242, Retrieved from the Internet <URL:https://www.msscientific.de/vacuum_manifolds_2018.pdf> [retrieved on May 23, 2019].

International Search Report PCT/EP2019/058397 dated Jul. 2, 2019 pp. 1-5.

Office Action dated Jun. 7, 2022 in the corresponding European Examination Procedure 19714215.1 (pp. 1-12).

Office Action in corresponding Japanese Patent Application No. 2020-554155 dated Mar. 30, 2023 (pp. 1-6) and English translation thereof (pp. 1-6).

* cited by examiner

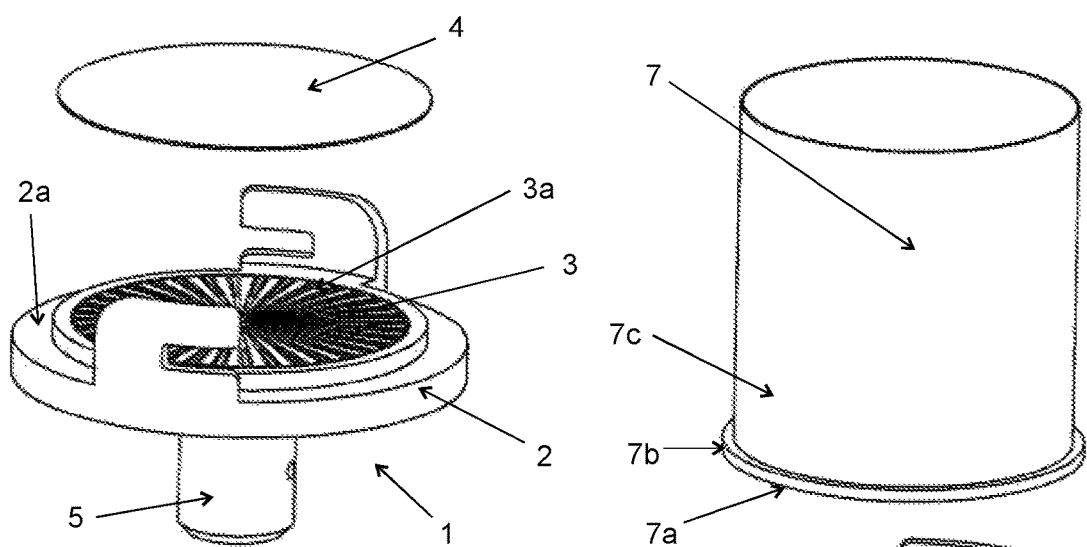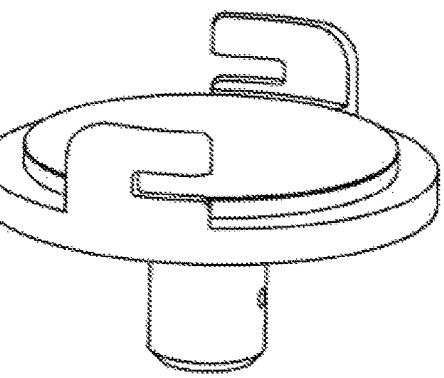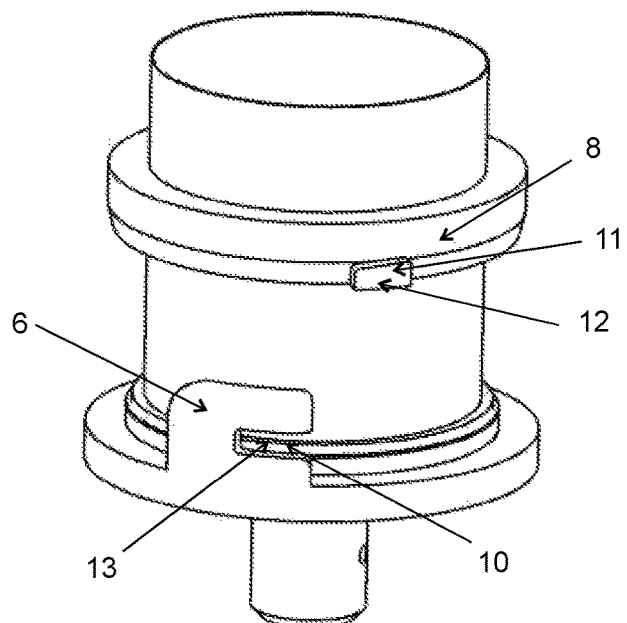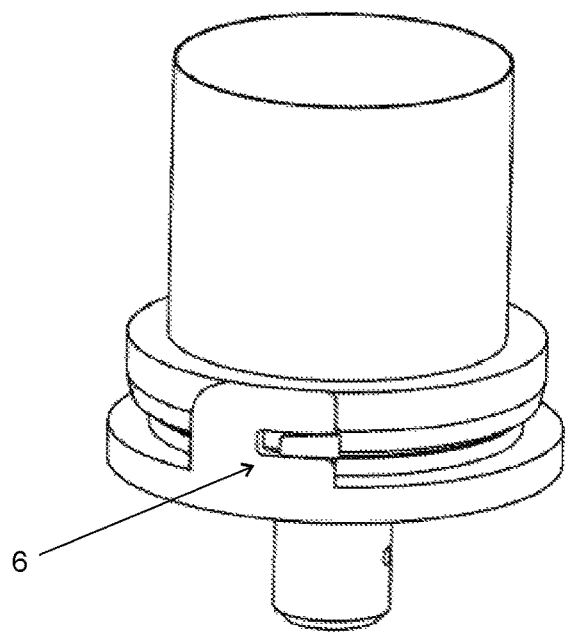

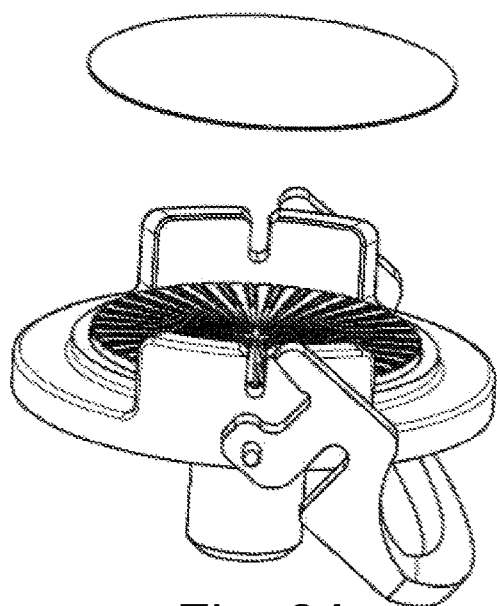
Fig. 2A
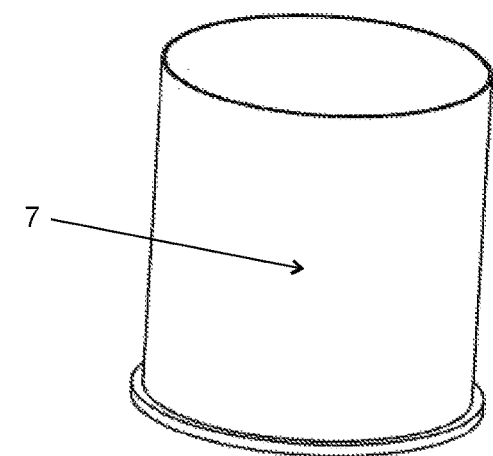
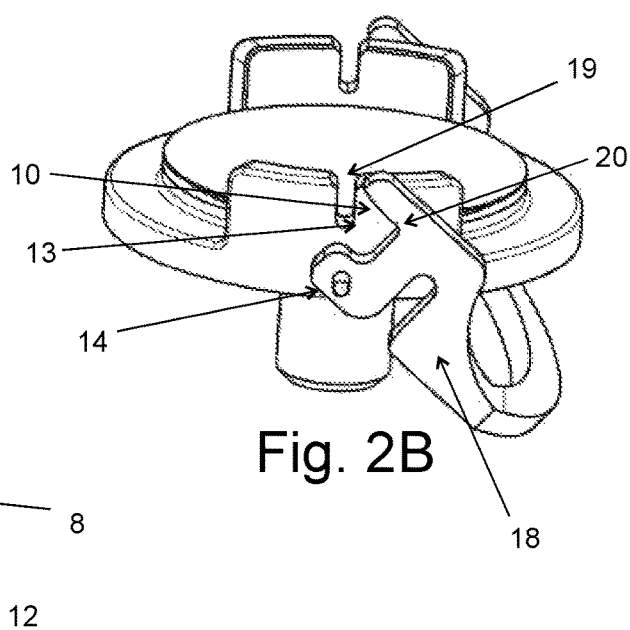
Fig. 2B
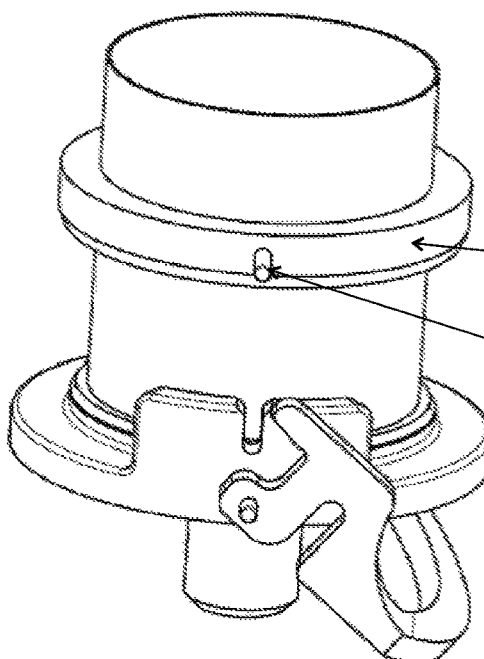
Fig. 2C
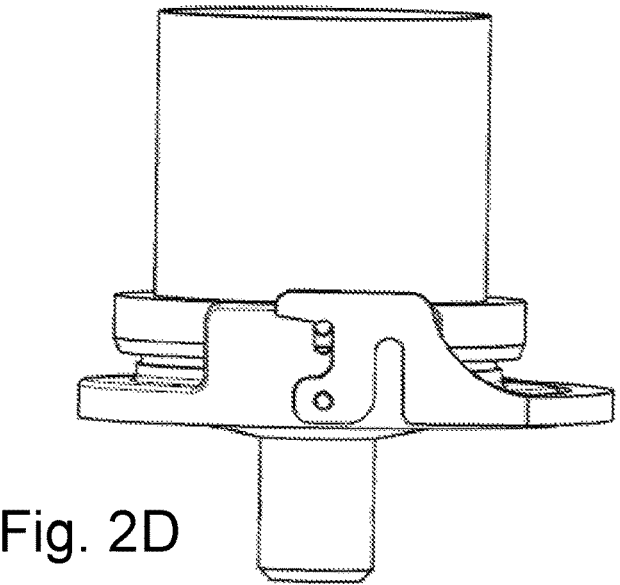
Fig. 2D

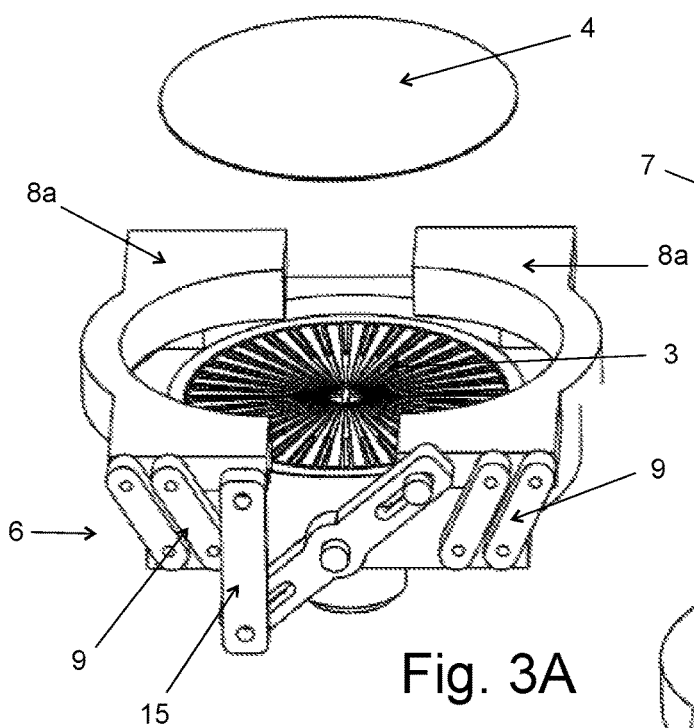
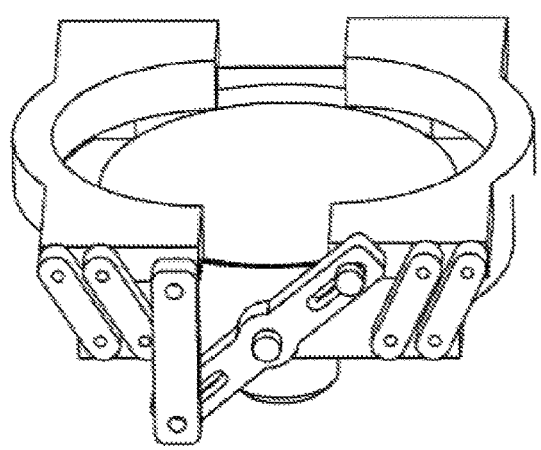
Fig. 3A
Fig. 3B
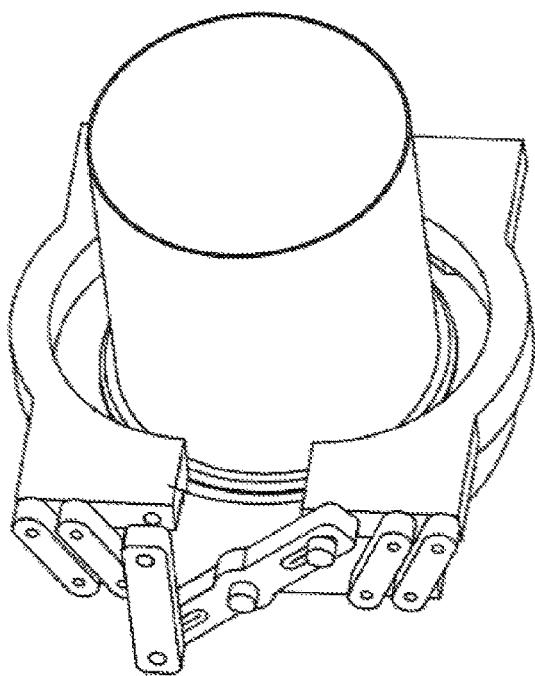
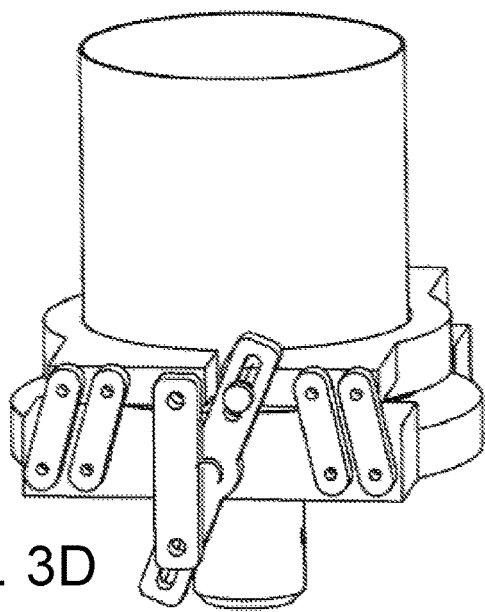
Fig. 3C
Fig. 3D

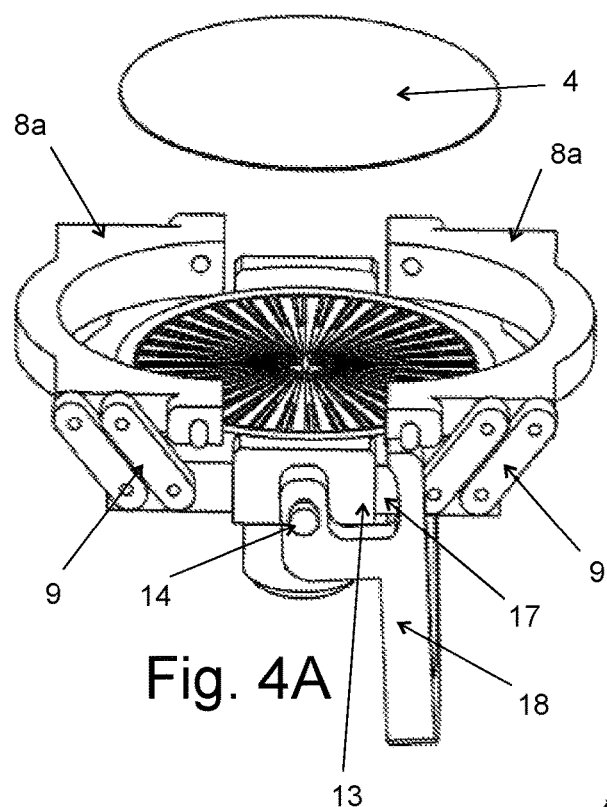
Fig. 4A
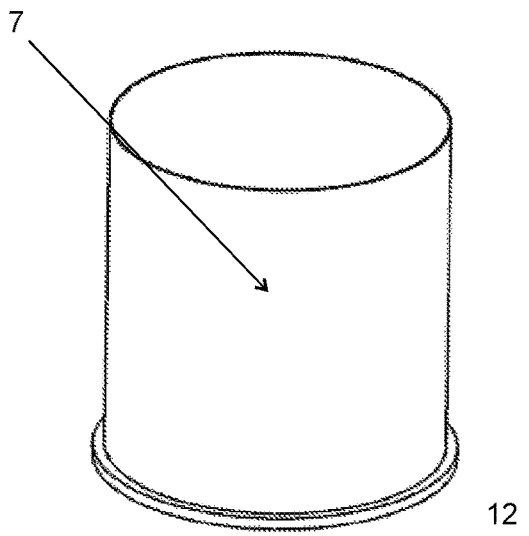
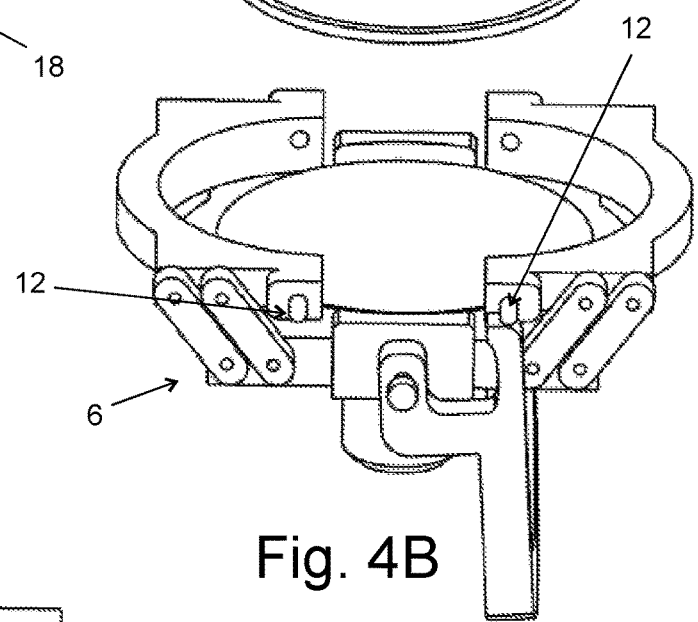
Fig. 4B
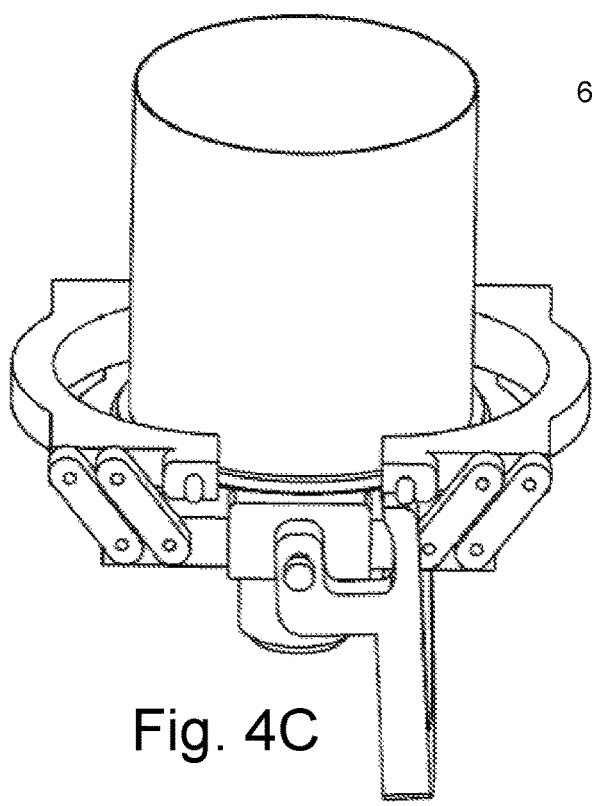
Fig. 4C

FILTRATION HEAD FOR A FILTER SYSTEM AND FUNNEL FOR USE IN CONJUNCTION WITH A FILTRATION HEAD

This invention concerns a filtration head for a filter system, in particular a manifold membrane filter system, and a funnel for use in conjunction with a filtration head.

This invention is applicable in particular in the fields of food and beverage, biopharmaceutical, cosmetics, hospital, but also for diagnostic, healthcare and research, in particular for bioburden and sterility testing.

Current solutions for bioburden and sterility testing in the above fields for filtering filterable samples like water, soft drinks, wine etc. with a typical volume of from 10 ml to one liter typically involve placing a membrane and a funnel on a manifold head, pouring the sample volume to be tested into the funnel and perform the filtration by reducing the pressure downstream from an outlet of the manifold head by means of a pump, removing the filter from the manifold head, and then removing the membrane and placing it onto an agar plate for incubation and further testing. The current bioburden testing with the above filtration method is based on single use funnels in plastic or on reusable funnels in stainless steel, plastic or glass. Reusable funnels after the filtration process must be decontaminated and cleaned whereas single use funnels are disposed in the trash. With the single use plastic funnels a lot of waste is generated and the ecological impact of plastic is high. For reusable funnels the need to clean and decontaminate the funnels after each test consume a lot of water and energy and cleaning residue which may be problematic to process and handle.

WO 2011/028704 A2 discloses a filtration assembly with a filtration head designed to support a removable filter element. The filtration assembly includes a sample reservoir for receiving a fluid to be filtered and a base for supporting the sample reservoir. The base includes an annular surface serving as a filter platform that supports the filter element and it includes a fluid port that communicates with the sample reservoir through a fluid flow path. The filter element may capture microorganisms of interest in the fluid sample and may be disposed adjacent the annular surface of the base. The filter element is accordingly arranged in the fluid flow path between the sample reservoir and the fluid port. Subsequent to the filtration of the desired sample volume the reservoir may be detached from the base to expose the membrane filter element supported on the annular filter support surface. The sample reservoir is generally cylindrical and is open at its upper and lower ends. According to WO 2011/028704 A2 the engagement between the sample reservoir and the base is made by a snap fit in which the lower end of the sample reservoir is received inside the upper end of the base. The lower end of the base has a groove and a radially outward projection which extend continuously around its entire outer periphery. The sample reservoir has a groove and a radially inward projection extending continuously around its entire inner periphery at its lower end. The respective projections will snap into and fit snugly inside the mating grooves, respectively, with an interference fit. The document also describes a bayonet fit or a threaded engagement as alternatives to the snap fit connection between the sample reservoir and the base. Further options described are a shrink wrap sleeve around the joint between the sample reservoir and the base or a light welding or bonding of the members to each other.

This filtration head is developed for plastic or stainless steel funnels and is not adapted for cardboard funnels due to physical properties of the material and risk of liquid leakage during filtration.

EP 1127607 A1 discloses another disposable membrane filter system and filtration head. This system includes a substantially dish-shaped filter holder integrally formed from resin material, to which a membrane filter can be mounted, and a cup-shaped paper funnel fixedly and inseparably secured to the holder. The holder has a filter receiving section for receiving the membrane filter. A drainage or drainpipe is also an integral part of the holder which communicates with a recess formed in the receiving section receiving a porous material which supports thereon the membrane filter. In operation, the drainpipe is connected to a vacuum pump which applies the suction power to the membrane filter via the porous material. The peripheral portion of the holder has a double-wall construction having an inner and an outer wall defining a ring groove which is filled with resin sealer material such as silicone. The paper funnel is a paper cup which extends down to provide a bottom peripheral flange. The bottom peripheral flange is inserted into the groove in the double-wall construction of the holder and fixed thereat by means of the hardened silicone sealer filled into the groove. Thus, the paper funnel is fixedly secured to the holder in a one-piece, disposable filter unit.

In another alternative disclosed in EP 1127607 A1 the holder is fitted with a seal ring formed as an integral product of silicone rubber having a bottom adapted to be placed on the funnel mount of the holder, and an inner wall and an outer wall, each standing from the bottom with an upward groove therebetween. The groove provides a diameter substantially equal to that of the bottom peripheral flange of the paper funnel and, when the seal ring with the peripheral flange of the paper funnel received in the groove is mounted on the funnel mount of the holder, the outer wall is elastically engaged with the peripheral wall of the holder. In this embodiment, too, the holder and the funnel are disposed after the filtration. Therefore, both alternatives produce a considerable amount of waste.

It is the object of the present invention to provide a filtration head for a filter system and a funnel for use in conjunction with such filtration head which can reduce the ecological impact and volume of waste generated during bioburden and sterility testing.

To solve the problem the present invention provides a filtration head for a filter system as defined by claim 1 and a funnel for use in conjunction with such filtration head as defined by claim 11. Preferred embodiments are defined in the respective dependent claims.

Accordingly, the present invention provides a filtration head for a filter system, comprising a base including a filter support for a removable filter element and a fluid path from one side of the filter element to be placed on the membrane support, through the filter element, and to a drainage outlet of the base, and a holder device for removably attaching a funnel to the base to form a sample fluid reservoir on the one side of the filter element, wherein the holder device comprises a ring-shaped element configured to extend about a bottom peripheral flange surrounding a lower end of the funnel and to selectively apply a biasing force on a radially outward protruding portion of the bottom peripheral flange of the funnel to press the funnel against the base.

The filtration head of the invention due to its construction with the holder device comprising a ring-shaped element engaging with the bottom peripheral flange surrounding the lower end of the funnel allows the use of cardboard funnels without the risk of liquid leakage between the funnel and the base. The possibility of using cardboard funnels considerably reduces the volume of waste for bioburden and sterility testing because the cardboard funnels can be produced with small amounts of energy, can be collapsed, burned or possibly decomposed depending on the type of paper material, and it accordingly reduces the environmental impact.

The invention also provides a funnel for use in conjunction with the filtration head for a filter system according to the invention, wherein the funnel is cup or cylinder shaped with an open top and an open bottom, wherein the funnel has a bottom peripheral flange surrounding a lower end of the funnel and having a radially outward protruding portion. Preferably, the base has a contact face surrounding the outer periphery of the membrane support for a fluid tight contact with the bottom peripheral flange of the funnel to be pressed against the contact face of the base.

Preferably, the ring-shaped element of the holder device is configured to be selectively brought into engagement with the radially outward protruding portion of the bottom peripheral flange of the funnel and, optionally, an adjacent portion of the outer peripheral wall of the funnel. Preferably, the ring-shaped element is a ring, preferably a closed ring, configured to be placed about the outer peripheral wall of the funnel.

Preferably, the ring-shaped element comprises plural ring-segments configured to be placed about the outer peripheral wall of the funnel and to be mechanically linked with each other.

Preferably, at least two ring-segments are mechanically linked to the base by a parallelogram mechanism configured to move the ring segments from a spaced apart position on the base allowing placement of the funnel between the ring segments and a closing position where the ring segments extend about the bottom peripheral flange and apply the biasing force on the peripheral flange to press the flange against the base.

Preferably, the at least two ring-segments are mechanically linked to each other and are configured to be moved by means of a single operation movement from the spaced apart position on the base and the closing position and apply the biasing force on the peripheral flange to press the flange against the base.

Preferably, the holder device comprises an engagement mechanism between the ring-shaped element and the base utilizing a wedge for selectively applying the biasing force on the radially outward protruding portion of the bottom peripheral flange of the funnel.

Preferably, the engagement mechanism comprises at least one protrusion on any one of the ring-shaped element and the base and at least one mating receptacle for the protrusion on the respective other one of the ring-shaped element and the base arranged to be brought into progressive engagement upon a relative rotation of the two.

Preferably, the protrusion or the receptacle is pivotally supported on the base by means of a lever.

Preferably, the funnel is mainly formed from cardboard or paper, optionally in combination with other disposable material and/or coating in a composite structure.

Preferably, the bottom peripheral flange surrounding the lower end of the funnel comprises a bulge that preferably has elasticity.

BRIEF DESCRIPTION OF THE DRAWINGS

The present invention will now be described in the form of various embodiments by reference to the attached drawing, in which: FIG. 1A-D show a first embodiment of the filtration head and the sequence of steps for attaching the membrane and the funnel to the base; FIG. 2A-D show a second embodiment of the filtration head and the sequence of steps for attaching the membrane and the funnel to the base; FIG. 3A-D show a third embodiment of the filtration head and the sequence of steps for attaching the membrane and the funnel to the base; and FIG. 4A-E show a fourth embodiment of the filtration head and the sequence of steps for attaching the membrane and the funnel to the base.

Figure 4D:
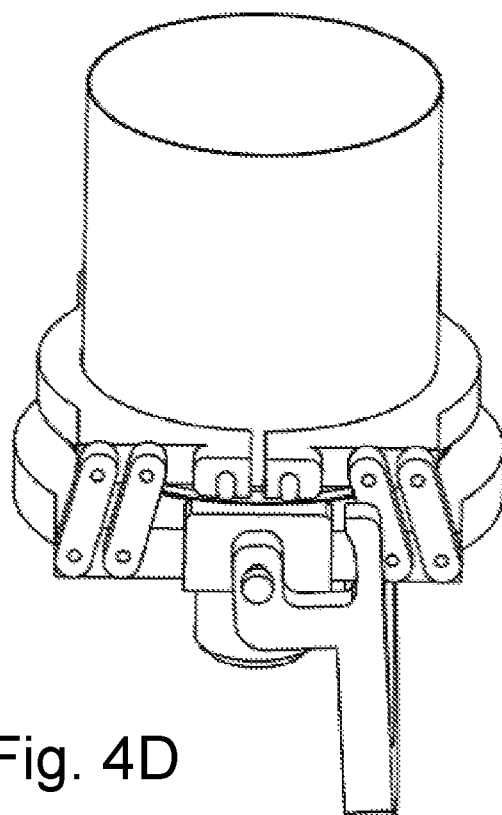

A filtration head for a filter system according to the invention is similar to the filtration heads disclosed in WO 2011/028704 A2 and EP 1127607A1 as far as the basic functions for supporting a removable filter element, providing a funnel defining a reservoir for holding a desired volume of sample fluid to be filtered, and guiding the sample fluid through a fluid path from the funnel through the filter element to a downstream drainage port upon application of a reduced pressure (vacuum) to the downstream side of the flow path are concerned.

The filtration head 1 in the form of an exemplary first embodiment shown in FIGS. 1A-C comprises a base 2 including a filter support 3 for a removable filter element 4 and a fluid path from one side of the filter element to be placed on the filter support 3, through the filter element 4, and to a drainage outlet 5 of the base 2. The filtration head 1 further comprises a holder device 6 for removably attaching a funnel 7 to the base 2 to form a sample fluid reservoir on the one side of the filter element.

The holder device 6 comprises a ring-shaped element 8 configured to extend about a bottom peripheral flange 7a surrounding a lower end of the funnel 7 and configured further to selectively apply a biasing force on a radially outward protruding portion 7b of the bottom peripheral flange 7a of the funnel 7 in order to press the funnel 7, or more precisely the flange 7a thereof against the base 2.

The base 2 has a flat contact face 2a surrounding the outer periphery of the filter support 3 for a fluid tight contact with the bottom peripheral flange 7a of the funnel 7 when the same is pressed against the contact face 2a of the base. The contact face 2a can be flat (as shown) or may have a profile, for example rounded and adapted to the contour of the flange 7a of the funnel 7.

The filter support surface of the filter support 3 may be planar or may be provided with grooves 3a and/or a porous material arranged to support the filter element and to direct fluid that has passed the filter element towards the drainage outlet 5. The annular membrane support surface may be further surrounded by a plurality of radial projections extending upwards from the surface of the support surface and serving to surround and position the filter element.

The filter element may include at least one filter medium compatible with the fluid being filtered and capable of removing microorganisms of interest from the fluid. The filter medium may be of any desired type such as a membrane like a microporous membrane or a hybrid filter element of various materials, or filter paper. A variety of filter media for microbiological studies are commercially available and any such filter media can be employed with the present invention as the filter element. The filter medium may capture microorganisms in any desired manner, e.g. according to size, by absorption, and/or affinity binding. Typically, filter media for use in microbiological studies like bioburden and sterility testing using the above filtration head are flat membrane discs.

The funnel 7 for use in conjunction with the filtration head of the invention is cup or cylinder shaped with an open top and an open bottom, wherein the funnel 7 has the bottom peripheral flange 7a surrounding the lower end of the funnel and having a radially outward protruding portion 7b. Such funnels can be similar, for example, to the commonly known simple paper cups turned upside-down and with the bottom omitted. The funnel 7 is mainly formed from cardboard or paper, optionally in combination with other disposable material in a composite structure and/or suitable coating(s). The cylinder shape can be straight or conical tapering outward at the bottom or at the top as preferred. The bottom peripheral flange 7a surrounding the lower end of the funnel 7 preferably comprises a rounded bulge that can have a certain elasticity that can improve the fluid tightness with respect to the contact face 2a as it can compensate slightly uneven application of the biasing force (described later) to achieve the fluid tightness.

The ring-shaped element 8 of the holder device 6 extending about the bottom peripheral flange 7a of the funnel 7 in operation is configured to be selectively brought into engagement with the radially outward protruding portion 7b of the bottom peripheral flange 7a of the funnel 7 and preferably an adjacent portion of the outer peripheral wall 7c of the funnel 7 in order to support the funnel against deformation and collapse in the lower portion and evenly distribute the biasing force about the periphery of the flange 7a.

In the embodiment of FIGS. 1A-D and 2A-D the ring-shaped element 8 is a ring, preferably a closed ring, configured to be placed about the outer peripheral wall 7c of the funnel. The inner diameter of the ring is dimensions to provide the tight fit with the wall of the funnel at least in the portion adjacent to the bottom peripheral flange 7a. The ring can be slotted, however, to provide a certain elasticity or can be formed from two or more ring segments that can be separated and connected together, for example by a snap-fit connection, to form a complete rigid ring about the funnel, to facilitate placement about the periphery of the funnel.

The holder device 6 of the filtration head 1 further has an engagement mechanism between the ring-shaped element 8 and the base 2 utilizing a wedge effect for selectively applying the biasing force on the radially outward protruding portion 7b of the bottom peripheral flange 7a of the funnel 7.

In the embodiment of FIGS. 1A-D the engagement mechanism comprises a pair of radial protrusions 12 (although at least one might be sufficient and more than two could be provided) on the ring-shaped element 8 at opposite positions on the outer periphery and a pair of mating receptacles 13 for the protrusions 12 on the base 2 arranged to be brought into progressive engagement upon a relative rotation of the two, wherein in FIGS. 1A-D the ring-shaped element 8 will be rotated relative to the base 2. The progressive engagement, which causes a pressure movement towards the base, is achieved in that the receptacle 13 and/or the protrusion 12 respectively has/have bevelled or inclined mutual contact surfaces 10,11 creating the wedge effect upon progressive engagement.

In the embodiment of FIGS. 2A-D the protrusions 12 are in the form of a pair of radial pins projecting at opposite positions on the outer periphery of the ring-shaped element 8 and the receptacle 13 is formed on a lever 18 that is pivotally supported on the base 2 at a pair of hinges 14. The pins 12 are received in a pair of recesses 19 on the base to prevent rotation of the ring-shaped element 8 and guide the movement of the ring-shaped element 8 towards the base. The wedge effect for creating the increasing biasing force is achieved by means of a bevelled or an inclined surface 10 on the upper side of the receptacle 13 engaging with the pins 12. At the rearward end of the inclined surface 10 is formed a locking recess 20 which can engage with the protrusion or pin 12 to create a certain snap fit connection that reduces the risk of an unwanted and inadvertent opening of the lever. In an alternative the hinges could be placed to create a certain eccentricity of the pivoting motion of the lever 18 that produces an increased bias on the pins 12 pressing them downward towards the base 2.

The arrangement of protrusion and receptacle can be exchanged between base and ring-shaped element in the embodiments of FIGS. 1A-D and 2A-D.

Figure 4E:
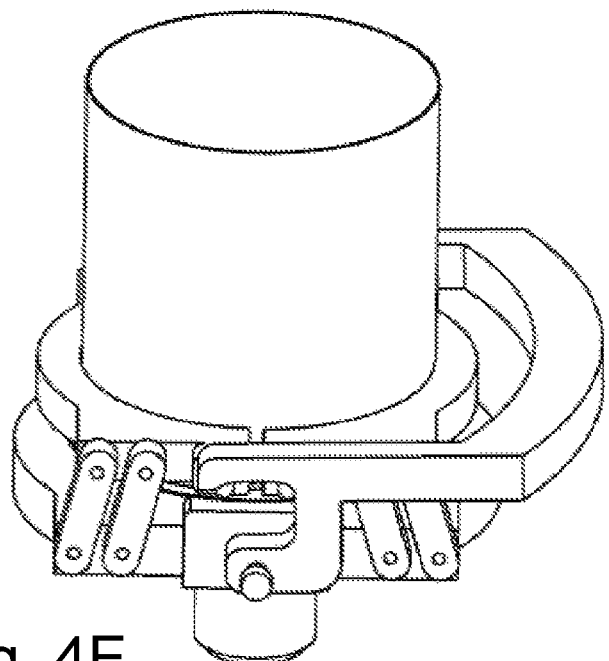

In the embodiments of FIGS. 3A-D and 4A-E the ring-shaped element 8 comprises plural ring-segments 8a configured to be placed about the outer peripheral wall 7c of the funnel 7. In both embodiments the ring segments 8a are mechanically linked to the base 2 by a parallelogram mechanism 9 configured to move the ring segments 8a from a spaced apart position on the base 2 allowing placement of the funnel 7 between the ring segments 8a and a closing position where the ring segments 8a are approached to each other and extend about the bottom peripheral flange 7a of the funnel 7 and at the same time apply the biasing force on the peripheral flange 7a to press the flange against the contact face 2a on the base 2 due to the slight downward movement created by the parallelogram mechanism 9.

In the embodiment of FIGS. 3A-D the ring-segments 8a are mechanically linked to each other by a lever mechanism 15 and are configured to be thus simultaneously and synchronously moved by means of a single operation movement between the spaced apart position on the base and the closing position and apply the biasing force on the peripheral flange to press the flange against the base. This embodiment can be modified such that the lever mechanism 15 cooperates directly or indirectly with a motor, for example a reversible motor, or another external remotely actuatable drive mechanism like a hydraulic or pneumatic cylinder to move and lock the segments.

In the embodiment of FIGS. 4A-E the ring-segments 8a are—at least for the first part of the movement towards the peripheral wall of the funnel—not mechanically linked to each other and are therefore independently moved. Once the ring-segments 8a are sufficiently approached to each other a lever 18 pivotally attached to the base 2 is turned until a receptacle 13 on the lever 18 is engaged with a pair of protrusions 12 on the ring-segments 8a. The receptacle 13 is, as described above in connection with the embodiments of FIGS. 1 and 2, provided with a bevelled, curved or inclined surface 10 that creates a wedge effect with the protrusions 12 and progressively and synchronously moves the ring-segments for the rest of the approaching movement towards each other and towards the contact face 2a on the base. The lever 18 just as the lever mechanism 15 in the embodiment of FIGS. 3A-D also serves to fix and safely hold the ring-segments 8a in place during the filtration process to avoid inadvertent opening of the ring segments.

The use of the filtration head of the present invention for bioburden or sterility testing comprises the following typical steps:

install the filtration head on the manifold of the filtration system;
    place filter element on the filtration head;
    place a (cardboard) funnel on the filtration head;
    fix the (cardboard) funnel on the filtration head using the holder device;
    pour the sample fluid into the (cardboard) funnel and start the filtration process;

after filtration, open the holder device and remove the funnel;

place the membrane filter element on an agar plate and incubate;

compact the cardboard funnel and put it in the recycling bin.

The invention claimed is:

1. A filter system comprising a filtration head (1), and a funnel (7)

the filtration head (1) comprising:

a base (2) including a filter support (3) for a removable filter element (4) and a fluid path from one side of the filter element (4) to be placed on the filter support (3), through the filter element (4), and to a drainage outlet (5) of the base (2), and a holder device (6) for removably attaching a funnel (7) to the base (2) to form a sample fluid reservoir on the one side of the filter element (4), wherein the holder device (6) comprises a ring-shaped element (8) configured to extend about a bottom peripheral flange (7a) surrounding a lower end of the funnel (7) and to selectively apply a biasing force on a radially outward protruding portion (7b) of the bottom peripheral flange (7a) of the funnel (7) to press the funnel (7) against the base (2)

wherein the base (2) has a contact face (2a) surrounding an outer periphery of the filter support (3) for a fluid tight contact with the bottom peripheral flange (7a) of the funnel (7) to be pressed against the contact face (2a) of the base (2); and wherein the funnel being cup or cylinder shaped with an open top and an open bottom, wherein the funnel (7) has a peripheral flange (7a) surrounding a lower end of the funnel (7) and having a radially outward protruding portion (7b).

2. The filter system of claim 1, wherein the ring-shaped element (8) of the holder device (6) is configured to be selectively brought into engagement with the radially outward protruding portion (7b) of the bottom peripheral flange (7a) of the funnel (7).

3. The filter system of claim 2, wherein the ring-shaped element (8) is a ring configured to be placed about an outer peripheral wall (7c) of the funnel (7).

4. The filter system of claim 3 wherein the ring-shaped element (8) is a closed ring.

5. The filter system of claim 2, wherein the ring-shaped element (8) comprises plural ring-segments (8a) configured to be placed about an outer peripheral wall (7c) of the funnel (7) and to be mechanically linked with each other.

6. The filter system for claim 5, wherein at least two ring-segments (8a) are mechanically linked to the base (2) by a parallelogram mechanism (9) configured to move the ring segments (8a) between a spaced apart position on the base (2) allowing placement of the funnel (7) between the ring segments (8a) and a closing position where the ring segments (8a) extend about the bottom peripheral flange (7a) and apply the biasing force on the peripheral flange (7a) to press the flange (7a) against the base (2).

7. The filter system of claim 6, wherein the at least two ring-segments (8a) are mechanically linked to each other and are configured to be moved by means of a single operation movement between the spaced apart position on the base (2) and the closing position and apply the biasing force on the peripheral flange (7a) to press the flange (7a) against the base (2).

8. The filter system of claim 2 wherein the ring-shaped element (8) of the holder device (6) is configured to additionally be selectively brought into engagement with an adjacent portion of an outer peripheral wall (7c) of the funnel (7).

9. The filter system of claim 1, wherein the holder device (6) comprises an engagement mechanism (10) between the ring-shaped element (8) and the base (2) utilizing a wedge structure suitable for selectively applying the biasing force on the radially outward protruding portion (7b) of the bottom peripheral flange (7a) of the funnel (7).

10. The filter system of claim 8, wherein the engagement mechanism (10) comprises at least one protrusion (12) on any one of the ring-shaped element (8) and the base (2) and at least one mating receptacle (13) for the at least one protrusion (12) on the respective other one of the ring-shaped element (8) and the base (2) arranged to be brought into progressive engagement upon a relative rotation of the at least one protrusion (12) and the receptacle (13).

11. The filter system of claim 10, wherein the protrusion (12) or the receptacle (13) is pivotally supported on the base (2) by means of a lever (18).

12. The filter system of claim 1, wherein the funnel (7) is mainly formed from cardboard or paper.

13. The filter system of claim 12 wherein the funnel (7) is mainly formed from cardboard or paper in combination with other disposable material and coating in a composite structure.

14. The filter system of claim 1, wherein the bottom peripheral flange (7a) surrounding the lower end of the funnel (7) comprises a bulge.

15. The filter system of claim 14 wherein the bottom peripheral flange (7a) surrounding the lower end of the funnel (7) comprises a bulge that has elasticity.

* * * * *